No. 865,087.
PATENTED SEPT. 3, 1907.
J. R. DOTY.
CAR MOVER.
APPLICATION FILED MAR. 28, 1907.
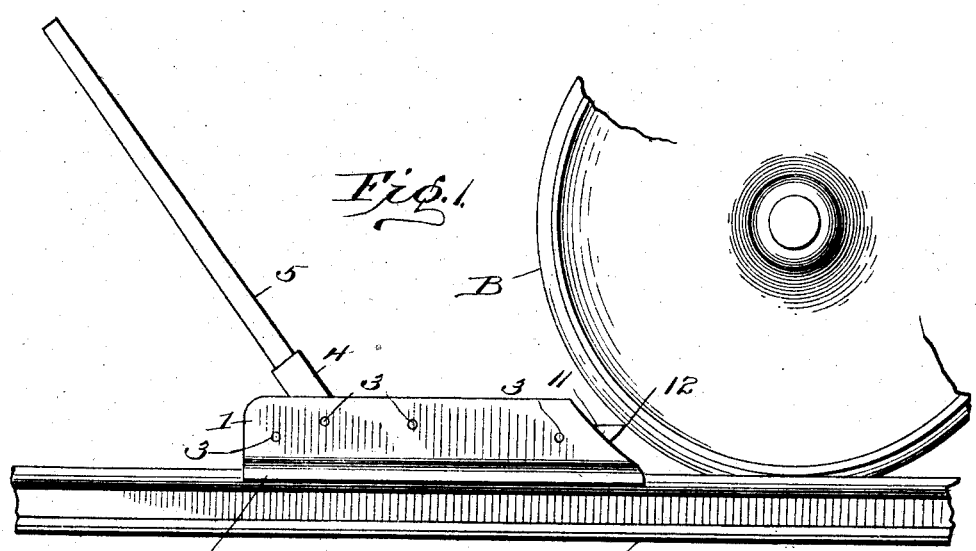
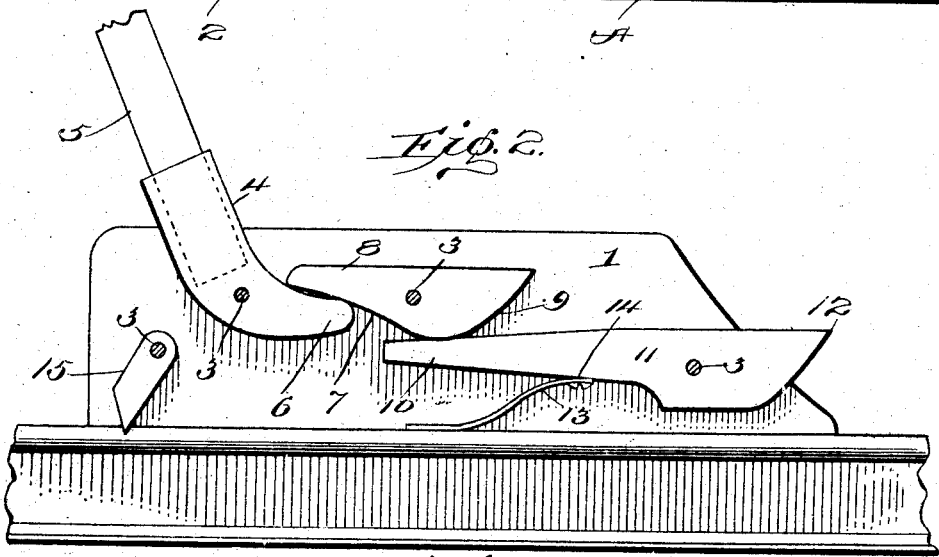
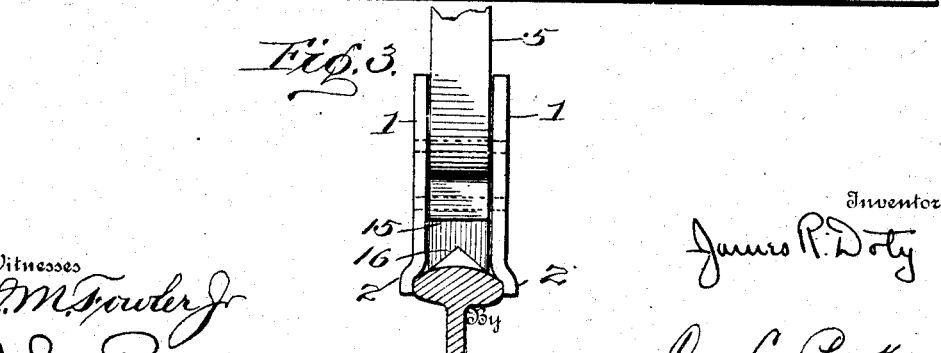

UNITED STATES PATENT OFFICE.

JAMES R. DOTY, OF KNOXVILLE, TENNESSEE.

CAR-MOVER.

No. 865,087.      Specification of Letters Patent.      Patented Sept. 3, 1907.

Application filed March 28, 1907. Serial No. 365,012.

*To all whom it may concern:*

Be it known that I, JAMES R. DOTY, a citizen of the United States, residing at Knoxville, in the county of Knox and State of Tennessee, have invented certain new and useful Improvements in Car-Movers, of which the following is a specification.

This invention relates to new and useful improvements in car movers and has particular reference to a device of the above type embodying co-actively engaging pivotal elements.

The invention has for its object to provide a device in which the movement of the operating lever is transmitted with a maximum degree of power to the wheel dog. For this reason the invention is of especial advantage in connection with heavily loaded freight cars in track or mill yards.

The invention aims as a further object to provide novel means for centering the device upon the track and means for preventing rearward movement of the car and the device itself, when a car is being forced up grade.

The detailed construction will appear in the course of the following description in which reference is had to the accompanying drawings forming a part of this specification, like characters of reference designating similar parts throughout the several views therein.

Figure 1 is a side elevation of a car mover constructed in accordance with my invention and showing the manner of use. Fig. 2 is a similar view of one of the side sections removed to show in detail elements to be hereinafter specifically referred to, and Fig. 3 is an end elevation thereof.

Referring specifically to the accompanying drawings the letter A designates a rail and the letter B a car wheel thereon.

In Fig. 1 the invention is shown in connection with the rail A and the wheel B and it specifically comprises side sections 1, having at their lower ends longitudinal off-set flanges 2 which engage the tread of the rail and serve to center the device thereupon. The side sections 1 are united in their spaced relation by bolts or pins 3 and these bolts or pins 3 in addition to the function of uniting the side sections 1 serve as pivots for the operating elements of the invention to be described. In the rear portion of the device there is pivoted a member 4 having a socket to receive an operating lever 5. The member 4 is formed with an off-set rounded end 6 which engages the rearward underneath cam surface 7 of a pivoted transmission member 8. The forward portion of the latter is enlarged and has a cam surface 9 which engages a rearward extension 10 provided upon a pivoted wheel dog 11. The dog 11 projects from between the sections 1 and has a sharp biting or engaging edge 12 which bears against the periphery of the wheel. The dog 11 is forced into engagement with the cam surface 9 by a spring 13, bearing with its free end against the rail and having its upper end fixed as at 14 to the dog 11. For the purpose of preventing rearward displacement of the device there, is pivoted between the extreme rear portions of the sections 1 a gravity dog 15 having a forked or serrated gripping edge 16 which engages the tread of the rail A.

In practical use the lever 5 is oscillated. In its downward movement the members 4 and 8, by virtue of the operative engagement set forth, depress the extension 10 and raise the forward end of the dog 11. Such action of course, moves the wheel B forwardly a slight distance on the rail A. When the lever 5 is raised spring 13 raises the rear end of the dog 11 and maintains the engagement thereof with the member 8. The action of the spring 13 also serves to restore the member 8 to initial position, though said member may be so proportioned that this function is accomplished by gravity. Simultaneously with its oscillation the lever 5 is given a slight pushing movement in order to always keep the dog 11 engaged with the wheel B.

The engaging parts can be made of hardened steel, and although simple in construction and inexpensive to manufacture, they are thoroughly practical and efficient in use.

While the elements herein shown and described are well adapted to serve the functions set forth, it is obvious that various minor changes may be made in the proportions, shape and arrangement of the several parts, without departing from the spirit and scope of the invention as defined in the appended claims.

Having fully described my invention I claim:

1. A car mover, comprising spaced side sections, a pivoted wheel dog arranged therebetween, a member loosely engaging said wheel dog to rock the same on its pivot, a lever loosely engaging said last named member, and a pivoted member adapted for engagement with a rail to prevent a rearward movement of the device, substantially as described.

2. A car mover comprising spaced side sections, a pivoted wheel dog arranged therebetween, a member loosely engaging said wheel dog to rock the same on its pivot and a lever loosely engaging said last named member.

3. A car mover of the type set forth comprising spaced side sections, a pivoted wheel dog arranged therebetween and having a rearward extension, a pivoted transmission member loosely engaging said rearward extension, to rock said wheel dog, a lever actuated element loosely engaging said pivoted member to actuate the same in its function, and a spring carried by said wheel dog for establishing a normal engaged relation between said rearward extension and said pivoted member.

4. A car mover, comprising spaced side sections, a pivoted wheel dog arranged therebetween, a member loosely engaging said wheel dog to rock the same on its pivot, a lever loosely engaging said last named member, and a gravity dog pivotally mounted between said sections and having a gripping edge adapted for engagement with a rail to prevent rearward movement of the device, substantially as described.

In testimony whereof I affix my signature in presence of two witnesses.

JAMES R. DOTY.

Witnesses:
WHEELER BARNETT,
JOHN P. BARNETT.